ns on Industry Applications, vol. IA-16, No. 2, Mar.-/Apr., pp. 186-192.

Walker et al., "A High Performance Controlled-Current Invertor Drive", IEEE Trans. Ind. Appl., vol. IA-I6, pp. 193-202, Mar./Apr. 1980.

*Primary Examiner*—David Smith, Jr.
*Attorney, Agent, or Firm*—C. M. Lorin

United States Patent [19]
Abbondanti

[11] 4,442,393
[45] Apr. 10, 1984

[54] APPARATUS AND METHOD FOR DETERMINING THE OPERATION OF AN INDUCTION MOTOR

[75] Inventor: Alberto Abbondanti, Penn Hills, Pa.

[73] Assignee: Westinghouse Electric Corp., Pittsburgh, Pa.

[21] Appl. No.: 354,700

[22] Filed: Mar. 4, 1982

[51] Int. Cl.$^3$ ............................................. H02P 5/40
[52] U.S. Cl. .................................. 318/802; 318/805; 324/158 MG
[58] Field of Search ............... 318/805, 808, 803, 802; 361/25; 324/158 MG

[56] References Cited

U.S. PATENT DOCUMENTS

| | | | |
|---|---|---|---|
| 3,809,960 | 5/1974 | Jossic | 361/25 |
| 3,909,687 | 9/1975 | Abbondanti . | |
| 3,909,688 | 9/1975 | Blaschke et al. . | |
| 4,011,489 | 3/1977 | Franz et al. . | |
| 4,245,181 | 1/1981 | Plunkett | 318/805 |
| 4,270,510 | 6/1980 | Woodbury | 318/802 |
| 4,290,001 | 9/1981 | Espelage | 318/811 |

FOREIGN PATENT DOCUMENTS 563631 7/1977 U.S.S.R. ...................... 324/158 MG

OTHER PUBLICATIONS

Blaschke, F., "The Principle of Field Orientation as Applied to the New Transvektor Closed-Loop Control System for Rotating-Field Machines", Siemens Review 39 (1972), No. 5, pp. 217-220.

Gabriel et al., "Field Oriented Control of a Standard AC Motor Using Microprocessors", IEEE Transac-

[57] ABSTRACT

From the sensed input voltages and currents fed into a standard induction motor the stator resistance is known instantaneously through a direct and quadrature treatment of the sensed quantities from which are derived at least four of the following five quantities: the motor overall reactance, the motor overall real impedance, the air gap reactance, the parallel combination of stator and rotor leakage reactances and the stator leakage reactance. This derivation uses the motor intrinsic characteristics at rest, while those four quantities are used in ascertaining the stator resistance instantaneously and recurrently during motor operation, thus, without any sensing means on the motor itself. The load reactance is also determined with the above-stated five quantities. From the knowledge of the stator resistance and the load resistance, a simulated two-phase network is provided and used to ascertain any of the key process variables typically used in an induction motor drive, such as shaft speed, slip, flux, torque. The temperature and load of a standard induction motor are known without sensing and the motor can be remotely controlled for protection against overheating, or overload.

14 Claims, 13 Drawing Figures

APPARATUS AND METHOD FOR DETERMINING THE OPERATION OF AN INDUCTION MOTOR

BACKGROUND OF THE INVENTION

The invention relates generally to control systems for AC induction motors, and more particularly to apparatus and method for the determination and derivation of signals which are representative of the dynamic characteristics of a standard induction motor under load.

The squirrel cage induction motor has structural and dynamic characteristics which make it superior to the DC motor, in particular for variable speed motor drives. These characteristics, however, are also the source of difficult control problems which in the past have prevented the user from obtaining with the AC machine such superior control performance as is inherent in a DC motor drive, despite much research effort and costly development of control techniques.

For instance, the absence of a commutator, or of slip rings, constitutes a definite operational advantage with the induction motor. Nevertheless, by this very fact, the torque producing rotor current is not available for measurement and direct control, which difficulty is not encountered with the armature current of a DC motor. It is also a definite advantage that no separate field winding and field power supply are necessary for the induction motor since three simple conductors suffice to provide both power and excitation. The drawback is that the field level inside the AC machine is not readily available, or controllable, as it would with a separately excited DC machine. The three feeding conductors, from a system point of view, may appear as a rather straightforward mode of excitation. However, when it comes to controlling the induction motor, due to this very simplicity, strong couplings do exist between field producing currents and torque producing currents, and these quantities appear too hopelessly intermingled in the three feeding conductors for any effective manipulation by the control engineer.

The induction motor with its short-circuited rotor is particularly attractive by its ruggedness and related reliability. The squirrel cage motor is also used to best advantage as a fixed speed motor since the demand is extremely large. This is the case for pumps. There, large production volume and low cost require full standardization. It is very important for such applications that control of the motor will not require additional sensors, transducers, or other devices which, while making control design easier, reduce the reliability and deprive the AC induction motor from its basic ruggedness. In particular, modifications internal to the motor should be avoided in order to keep it a standard unit of low cost.

New techniques have been developed which give the AC motor qualities of performance which are comparable to any standard DC motor drive. These techniques, however, up to now have not been implemented without impairing the aforementioned qualities of ruggedness, of reliability, of standard fabrication so much sought for.

One of these new techniques is known as "field orientation". See: Felix Blaschke, "The Principle of Field Orientation as Applied to the New TRANSVEKTOR Closed-Loop Control System for Rotating-Field Machines" in Siemens Review 39 (1972), No. 5, pp. 217–220.

With "Field Orientation" the stator current wave is vectorially resolved in two orthogonal components, one in phase with the internal flux wave and one in quadrature with it. The first component is used to assess and control the excitation level. The second component is used to assess and control the level of generated torque. Through proper vectorial transformation applied to the motor currents and voltages, these two components can be sensed and altered independently, providing a perfectly decoupled system resembling a DC motor, in which separate control of field and armature current is possible. A considerable amount of signal processing is necessary to attain this result and only with the advent of the most recent microcomputer technology has it become reasonable to reduce this concept into practice. See: R. Gabriel, W. Leonhard and C. Nordby, "Field Oriented Control of a Standard AC Motor Using Microprocessors", a paper presented at the 2nd International Conference on Electrical Variable Speed Drives, published by the Institution of Electrical Engineers (1979) pp. 146-150. In this article, a control method is described making use of the dynamic model of an induction motor in order to achieve, with a microprocessor, "field-oriented" control without, like in F. Blaschke, having to insert Hall generators into the motor. However, Gabriel, Leonhard and Nordby fail to achieve control of a standard AC motor because, as explained hereinafter when describing the present invention, they have been unable to ascertain the instantaneous value of the stator resistance when the motor is running. In other words, their dynamic model would require the measurement of temperature on the rotor.

It appears that, with the "field-orientation" control method, precise information is required regarding the phase and magnitude of the rotating flux space vector. As a matter of fact, this is also a requirement with other prior art advanced methods of control. This is the case for instance with the "torque angle" method advocated by L. H. Walker and P. M. Espelage in "A High Performance Controlled-Current Inverter Drive", IEEE Trans. Ind. Appl., Vol. IA-16, pp. 193-202, Mar. Apr. 1980. The information required regarding the flux is in general obtained with sensors embedded in the machine, or it is derived from transducers applied to the shaft.

As shown in U.S. Pat. No. 3,824,437 of F. Blaschke, two voltages indicating the airgap field are derived with two Hall probes displaced at 90° phase relationship. Otherwise, flux regulation has been added with flux rate sensing coils, as in U.S. Pat. No. 4,011,489 of J. P. Franz and A. B. Plunkett. It has also been proposed to derive an indication of the flux directly from the AC voltages at the terminals and of the line currents by a method involving the resistive voltage drop component across the stator. See: U.S. Pat. No. 4,245,181 of A. B. Plunkett. This approach is affected by the thermal drift of the stator resistance, which is the same problem as with the Gabriel, Leonhard and Nordby approach in which the flux is derived from a speed signal by integrating a differential equation relating the rotor current and the magnetizing current. A correction has been proposed which requires that the speed be sensed and known with great accuracy. This necessitates, however, optical incremental transducers to be mounted on the shaft, which are vulnerable in a hostile environment and introduce a weak link in the chain of reliability. More generally, they impair the basic ruggedness of the induction motor and take away the advantage of standardization.

The present invention provides for the use of a standard motor while providing an improved and more advanced approach to the determination of the dynamic characteristics of the induction motor under load thereby to afford the benefit of high performance and reliability with modern control techniques.

SUMMARY OF THE INVENTION

It has now been realized that all information characterizing in real time the operation of an induction motor is available from the equivalent diagram of such a motor, given the known characteristics of the stationary motor as manufactured, provided the instantaneous stator and load resistances, e.g. at the present temperature of operation, and present speed are known. Since the present temperature should not be measured and the resistance cannot be measured when the motor is running, such instantaneous resistances are determined by computation involving only the known standard characteristics of the motor, namely: the stator inductance, the rotor inductance, the magnetizing inductance and the sensed terminal voltages and line current inputted to the motor for a given frequency of the power supply.

Once the equivalent circuit has been determined, it is adjusted instantaneously in order to reflect the true stator resistance and the true load resistance of the motor in real time. From such adjusted equivalent circuit every dynamic characteristic of the running motor is available and singly or severally by computation is, or are, derived for the desired control of the motor, such as the flux, the torque, the slip, the shaft speed, and/or the temperature of the stator.

DESCRIPTION OF THE PREFERRED EMBODIMENT

An induction motor, standard from fabrication, is known from the manufacture to have the following characteristics:

$L_1$ the leakage inductance of the stator, $L_2$ the leakage inductance of the rotor, $L_M$ the magnetizing inductance, $R_{1(0)}$ the stator resistance at normal temperature and $R_{2(0)}$ the rotor resistance at normal temperature. It is also known that for a frequency $\omega_1$ of the power supply to the motor, and a shaft speed $\omega_m$, the slip frequency of the motor is $\omega_2 = \omega_1 - \omega_m$. It is further known that the load resistance $R_L$ of the motor is given by the relation:

$$R_L = R_2(\omega_1/\omega_2)$$

Figure 1:
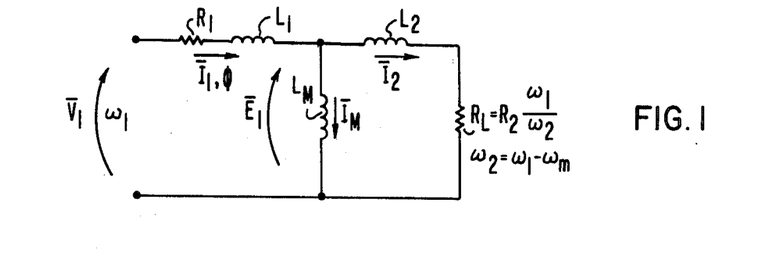
FIG. 1 is the equivalent diagram of a stationary induction motor.

Referring to FIG. 1, the equivalent diagram of an induction motor is well known to include under an applied voltage $\overline{V}_1$ a series network including resistor $R_1$, inductance $L_1$, inductance $L_2$ and load resistance $R_L$, with a shunting path from the common junction between resistors $L_1$, $L_2$ across the series combination of $L_2$ and $R_L$.

The equivalent diagram is known to provide: the magnetizing current $I_M$ passing in the $L_M$ branch under a voltage $E_1$, the rotor current $I_2$ passing through $L_2$ and $R_L$, the stator current $I_1$ phased by $\phi$ which is in the common path through $R_1$ and $L_1$. The airgap voltage $E_1$ given between the two ends of $L_M$, and $\phi$, the vectorial phase relation $\phi$ between $V_1$ and $I_1$, are also characterizing the power input to the motor.

With the equivalent diagram of FIG. 1, it is well known to reconstruct the airgap voltage $\overline{E}_1$ using the motor terminal quantities $\overline{V}_1$, $\overline{I}_1$, $\omega_1$ by vectorially subtracting the stator drop $\overline{I}_1(R_1 + j\omega_1 L_1)$ from the applied voltage $\overline{V}_1$. The flux vector is then obtained by integration of $\overline{E}_1$. This method, however, introduces large errors at low frequency which are due to an uncertainty relating to $R_1$, which is a thermally sensitive element. It has been proposed to correct $R_1$ for temperature by sensing the motor frame temperature. This approach is impractical. Moreover, as earlier stated, a temperature sensor is not desired. It also has been shown (U.S. Pat. No. 3,909,687 of A. Abbondanti) that the drift of $R_1$ can be ignored if a proper algorithm is used to obtain information on the flux magnitude. With this approach, however, information on the flux phase, or angular position is not available.

An improved method by which the thermal variations of $R_1$ inside the machine and the variations of $R_L$ with temperature and slip can be detected and instantaneously tracked calls for an "observer" reconstructing the motor's equivalent circuit. Information on any motor internal quantity can, then, be readily obtained by merely sensing the quantity sought directly from the observer. As a result, information on quantities which are more complex than the flux vector itself, can be derived, thereby enabling the use of advanced "field orientation" techniques. For instance, the synthetic "rotor magnetizing current" $I_M$, is derived from the "observer" from a combination of the magnetizing current vector and the rotor current vector.

Figure 2:
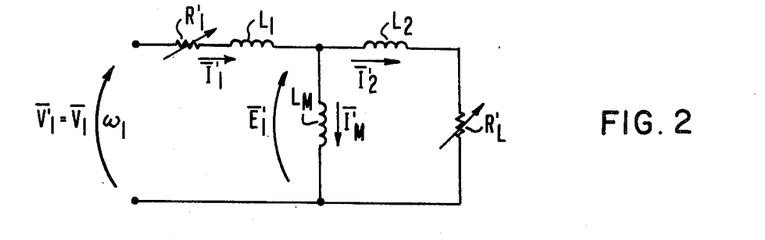
FIG. 2 is the equivalent diagram of FIG. 1 modified so as to include elements representing the instantaneous resistance of the stator and the instantaneous load resistance when the motor is running.

Referring to FIG. 2, the equivalent diagram, once it has been modified to embody the actual resistance $R'_1$ and the actual load resistance $R'_L$, in actuality becomes an "observer". The circuit of FIG. 2 can be considered as an actual model, or simulated network of the motor implemented with actual physical components. Preferably, however, this circuit will be realized through mathematical relationships providing a real time numerical simulation of the machine accomplished with a microcomputer. The magnetic components are assumed constant and known and are identical in value to their counterparts in the actual machine, except perhaps for a scaling factor taking into account a fixed impedance ratio between the model and the actual machine. The values of the resistive components $R_1$, $R_L$ and $R_2$ in the actual machine, however, are not known and are constantly changing. $R_1$ deviates from the motor data sheet value because of an unknown heating condition of the motor. $R_L$ is unknown because it depends upon the shaft speed $\omega_m$, and therefore the slip frequency $\omega_2$, which are unknown since, as assumed here, the motor lacks any speed transducer, and also because the thermal drift of $R_2$ is not known. Therefore, the resistive elements in the model, or simulated network, are represented by true variable resistors $R'_1$ and $R'_L$ as ascertained instantaneously according to the present invention.

On the model given by FIG. 2 is impressed the same voltage as appears across the motor (except for the aforementioned possible constant scale factor), whether the motor drive is of the voltage source, or of the current source kind. Should the variable resistors $R'_1$ and $R'_L$ match exactly the values of their true counterparts in the actual motor, then, the input terminal currents will be matched in both the motor and the model, and so will be all the internal quantities. In such case, the model will be an "observer" faithfully accounting for all motor internal signals. Accordingly, all these signals become available for sensing from the simulated network. In this fashion, by sensing the magnetizing current $I'_M$, information is provided regarding the flux as required when using the "field orientation" control techniques.

The problem reduces itself, thus, into achieving such matching conditions $R'_1$-$R_1$ and $R'_L$-$R_L$ and in being able to maintain these resistances so matched under varying load and temperature conditions. This is the problem of *identifying* the "observer" elements with their actual counterparts in the motor and of updating such identification through time so as to ensure in real time continuous tracking between model and machine. It will be now shown how the values of $R_1$ and $R_L$, which are hidden in the motor, can be independently derived, solely from the sensed motor terminal electrical quantities.

Referring to the calculations given hereinafter in an Appendix, it appears that $R_1$ is a function of the motor's input quantities that is expressed independently from any knowledge of the value of $R_L$. This function is:

$$F_1 = b - r \quad (1)$$

with $b = 2W_y/I_1^2$ where $W_y = V_1 I_1 \cos \phi/2$ is the "real power" applied to the motor and $r = [a - \omega_1 L_M L_2/(L_M + L_2)][\omega_1 L_M - a]^{\frac{1}{2}}$, with $a = 2W_x/I_1^2 - \omega_1 L_1$, where $W_x = V_1 I_1 \sin \phi/2$ is the "reactive power" applied to the motor.

From these formulae, it also appears that a is the "air gap reactance" of the motor; that $2W_x/I_1^2$ is the overall "reactance" of the motor; that $b = 2W_y/I_1^2$ is the overall "real impedance" of the motor; that $\omega_1 L_M$ is the "magnetizing reactance", and that $\omega_1 L_M L_2/(L_M + L_2)$ is the parallel combination of stator and rotor leakage reactances.

The computation is performed according to function $F_1$ using the motor input quantities. The resulting value of $F_1$ is then assigned to $R'_1$, whereby $R_1$ in the "observer" becomes a quantity in real time, taking properly into account the scaling constants, if any. The computations are performed with a microcomputer. It is observed that there is no particular requirement for speed in performing the calculations, since the variations of $R_1$ as a function of temperature are relatively slow. If $R_1(0)$ is the resistance value of $R_1$ at room temperature, relation (1) can be used to calculate the drift $\Delta R_1 = F_1 - R_1(0)$. $R'_1$ appears to include a fixed component equal to $R_1(0)$ and a variable component identified as $\Delta R_1$.

Similarly, for $R'_L$, the instantaneous load resistance is calculated with a formula derived as shown in the Appendix. The function $F_L$ expresses the value of $R_L$ independently from any knowledge of the value of $R_1$. Again, the variables in this function are the input quantities from the power supply to the motor. This function is expressed as follows:

$$F_L = \omega_1(L_M + L_2)\{[a - \omega_1 L_M L_2/(L_M + L_2)]/[\omega_1 L_M - a]\}^{\frac{1}{2}}$$

It appears that function $F_L$ involves $\omega_1(L_M + L_2)$ which is the sum of the "magnetizing" and "rotor leakage" reactances; the "air gap reactance" a; the parallel combination of the "stator" and "rotor leakage" reactances; as well as the "magnetizing reactance" of the motor.

Accordingly, function $F_L$ is calculated using the motor's input quantities. Again, the resulting value is assigned to $R'_L$ in the "observer". The time allowable for these calculations, is more critical than for the calculations of $F_1$ since the variations of $R_L$ may be very rapid under conditions of fast varying loads.

The induction motor may be a six-phase motor, a three-phase motor or a two-phase motor. However, for all practical purposes it is a three-phase motor. Then, all three phases of the motor must participate in the treatment with an "observer". To this effect, the three phase system can be resolved into a two-phase system as shown in the aforementioned Abbondanti patent. The transformations illustrated on FIGS. 3 and 4 use terminal voltages $\overline{V}_{1a}$, $\overline{V}_{1b}$, $\overline{V}_{1c}$ which are the three line-neutral motor voltages, and only two line currents $I_{1b}$, $I_{1c}$ are necessary. From these are derived $\overline{V}_{1d}$, $\overline{V}_{1q}$ the synthetic two-phase motor voltages and Ihd $1d$, $I_{1q}$ the synthetic two-phase stator currents.

Figure 3:
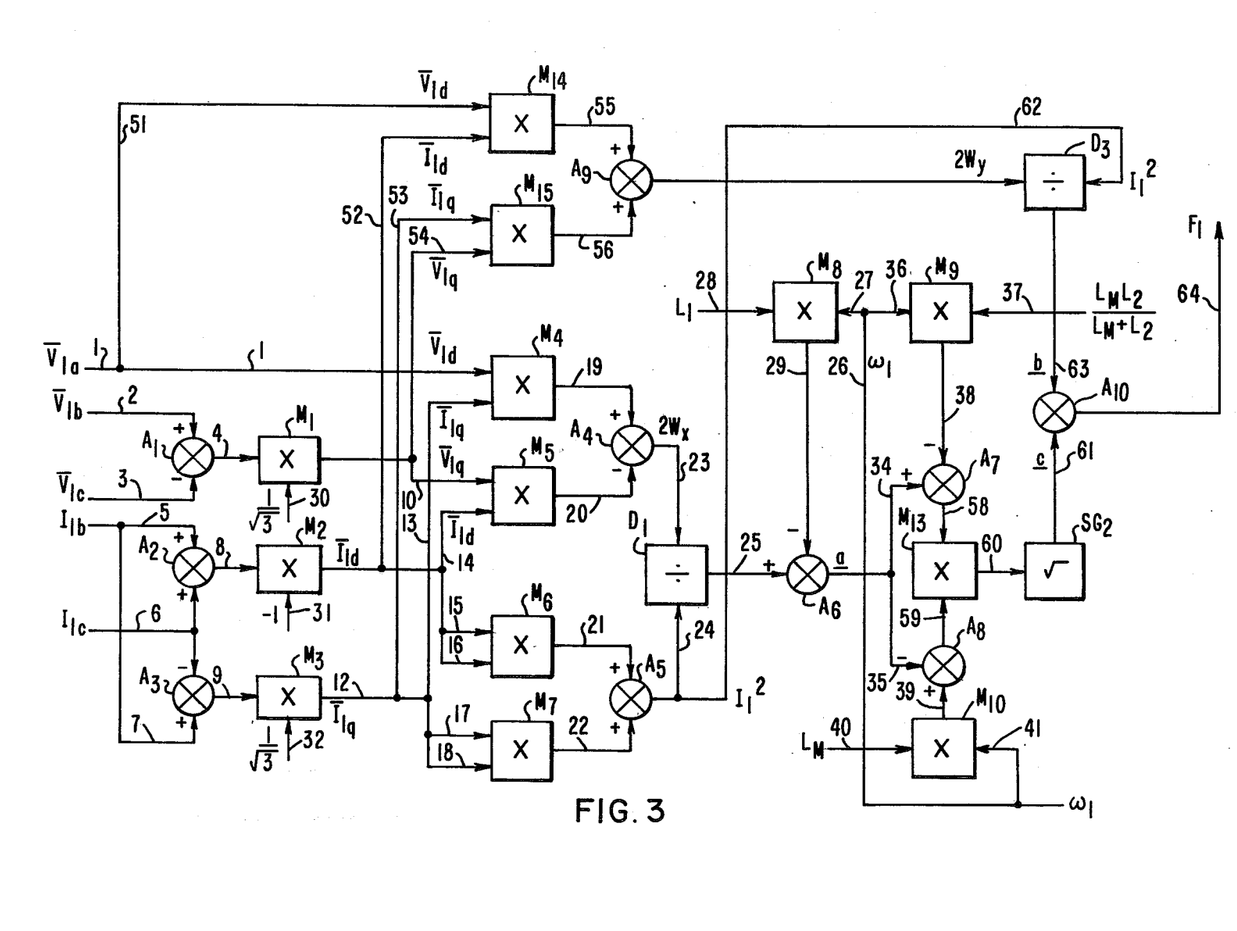
FIG. 3 is a functional diagram illustrating in analog form how the basic function characterizing the instantaneous resistance of the motor is derived from the sensed terminal voltages and the sensed line currents of the motor.
Figure 4:
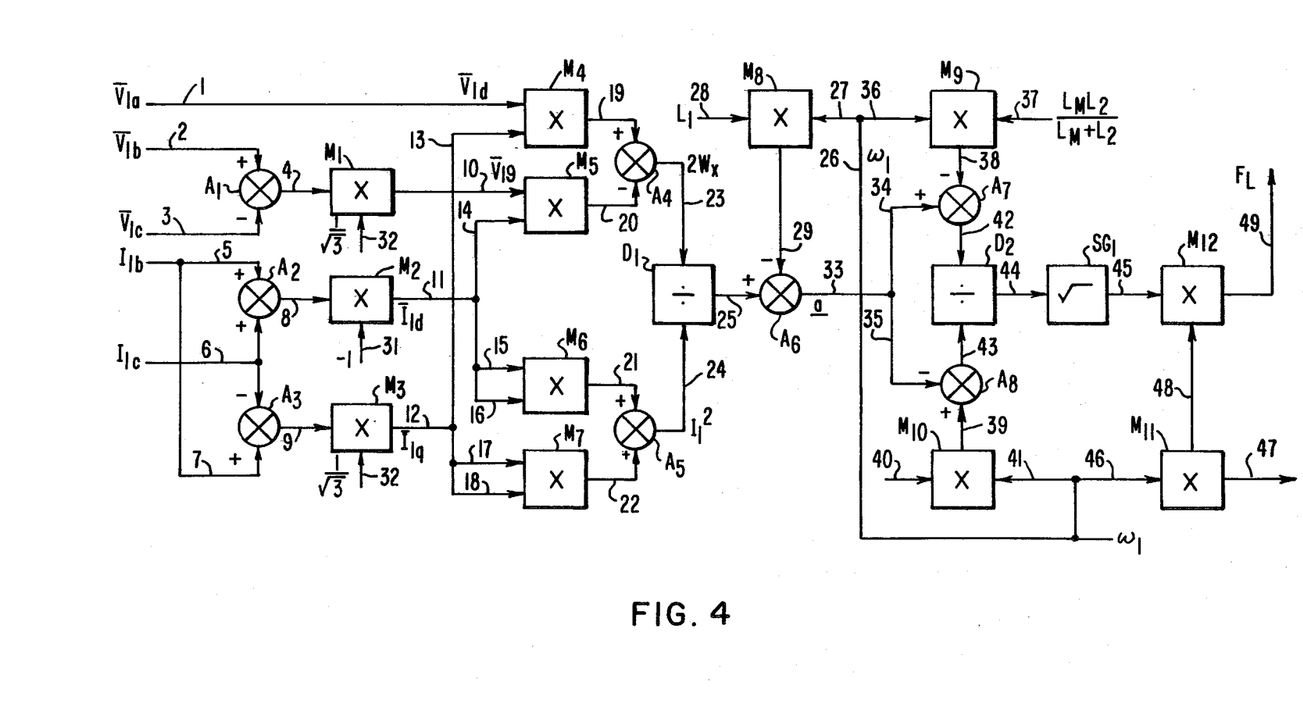
FIG. 4 is a functional diagram illustrating in analog form how the basic function characterizing the instantaneous load resistance of the motor is derived from the sensed terminal voltages and the sensed line currents of the motor.

FIGS. 3 and 4 also illustrate with analog components how direct and quadrature vector representative signals are combined to obtain the intermediary variables $I_1^2$, $W_x$ and $W_y$. FIG. 3 illustrates in block diagram how the function $F_1$ is obtained, while FIG. 4 shows in block diagram the derivation of function $F_L$.

Figure 5:
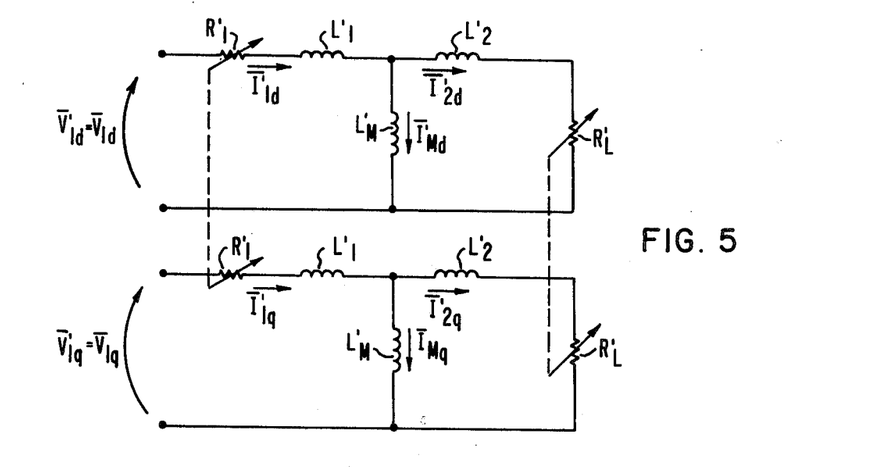
FIG. 5 is a two-phase representation of the equivalent diagram of FIG. 2, thus involving direct and quadrature vectorial representations of the sensed terminal voltages and line currents.

Referring to FIG. 5, the "observer" consists of two motor equivalent circuits, one for the direct axis, the other for the quadrature axis, according to the "field orientation" distinction. The magnetic elements are fixed and correspondingly equal in each circuit. The resistive elements are adjustable and vary together. Whether the motor drive is of the voltage source type, or of the current source type, the same motor voltage is impressed on the observer. Thus $\overline{V}_{1d}$ is made equal to $\overline{V}_{1d}$ and $\overline{V}'_{1q}$ is made equal to $\overline{V}_{1q}$, where $\overline{V}_{1d}$, $\overline{V}_{1q}$ are as derived in FIG. 3 or in FIG. 4.

The model or simulated circuit constituting the "observer" may be built physically in all its components. However, with the advent of microcomputer technology, it is most practical to implement it with a microcomputer. The functions of FIGS. 3 and 4 are then performed numerically, using a numerical representation of the "observer".

In the Appendix are formulated mathematical expressions providing the basis for such numerical representation. The three motor terminal voltages are periodically sampled and at each sampling interval (n) the transformations illustrated by the diagrams of FIGS. 3 and 4 are applied to the sampled data, thereby yielding the instantaneous direct and quadrature voltages $v_{1d}(n)$, $v_{1q}(n)$. These values, together with the previously calculated values of $R'_1$ and $R'_L$ are used to calculate the terms $C_{T1}$ and $C_{T2}$ and the coefficients $A_1$, $A_2$ and $B_1$ in accordance with the set of equations (B.3) of the Appendix. This allows the determination of the $i_1(n)$ input current direct and quadrature components as follows:

$$i_{1d}(n) = C_{T1d}/D$$

$$i_{1q}(n) = C_{T1q}/D$$

where D is the determinant as defined in the (B.10) set of equations of the Appendix.

The other currents namely, $i_M(n)$ and $i_2(n)$ are determined for each d or q component in the same manner using respective equations (B.6) and (B.7) of the Appendix. These determinations lead to any particular motor parameter as intended to be derived with the "observer" for control of the motor.

Figure 6:
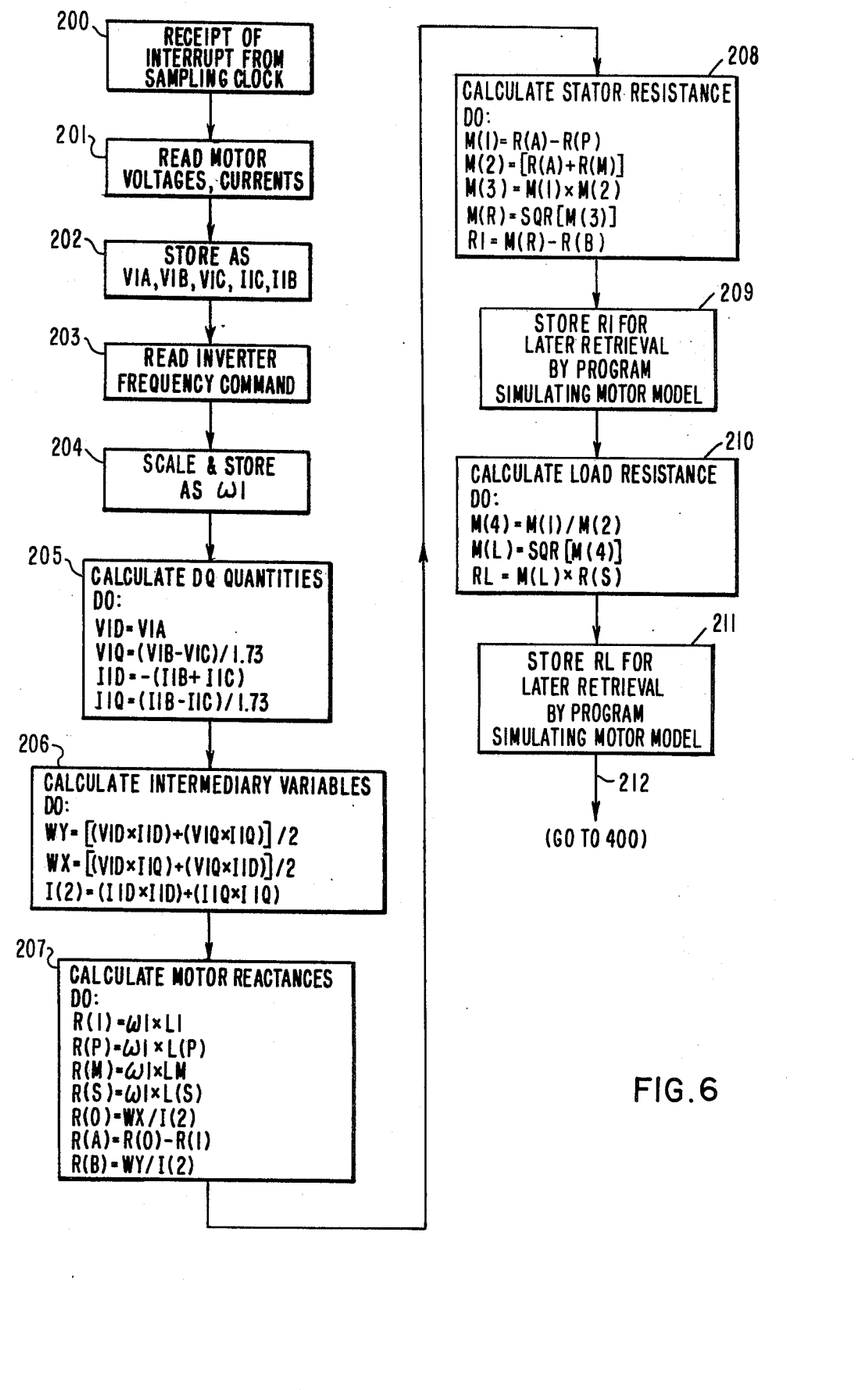
FIG. 6 is a flow chart explaining the calculation of the basic functions of FIGS. 3 and 4.

Referring to FIG. 6, a flow chart illustrates how the implementation can be performed with a microcomputer. A 16-bit microprocessor can be used for fast execution of a series of multiply and divide instructions like indicated in the flow chart. Such a microprocessor typically is an INTEL 8086 microprocessor, as made an integral part of the motor controller equipment marketed by the Westinghouse Electric Corporation under the trade name "Microprodac". More specifically, a 86/12A single board computer uses an 8086 processor in combination with an SBC-732A analog I/O board for digital conversion of the sensed analog input data, namely the three terminal voltages and two of the phase line currents of the motor. The simulated network is looked upon in real time and the computations leading to real time values of resistor $R'_1$ and $R'_L$ are executed under an interrupt. The interrupt pulses are generated by a conventional pulse generator operating at a frequency of typically 1 kHz. Therefore, every millisecond, the processor receives an interrupt pulse and starts executing the routine illustrated in the flow chart of FIG. 6. After execution, the processor returns to the task which it was performing before the interrupt. This task may be some low priority process relating to motor control. Otherwise, the processor may remain idle in a halt condition awaiting another interrupt. In other words, at the frequency of the interrupt the values of $R_1$ and/or $R_L$ are refreshed in real time. The computation process following the flow chart of FIG. 6 is as follows:

At 200, the interrupt signal is received starting a series of computations from block 205 on, based on voltages and current quantities $V_{1a}$, $V_{1b}$, $V_{1c}$, $I_{1b}$, $I_{1c}$ which have been read at 201 and which are stored in memory at 202. The calculations are using as data the inverter frequency command which is read at 203 and scaled, then stored as $\omega_1$ at 204.

Then, at 205, the following calculations are done. The direct voltage $V_{1d}$ in memory is made equal to the stored value $V_{1a}$. Similarly, the quadrature voltage V1Q is made equal to the difference between the stored values V1B, V1C, divided by 1.73. Next, the direct current I1D is made equal to the negative of the sum of (I1B+I1C). The quadrature current $\bar{I}_{1q}$ noted as quantity I1Q is made equal to the difference (I1B–I1C) between the stored values if $\bar{I}_{1b}$ and $\bar{I}_{1c}$, divided by 1.73. These direct and quadrature voltage and current quantities are used in block 206 to calculate the real power $W_y$, the reactive power $W_x$ and the square of the motor current $I_1$, the latter defined by $\bar{I}_{1d}$ and $\bar{I}_{1q}$. $W_y$ is made equal to the sum of two products, which is halved. One product is of the direct voltage quantity V1D by the direct current quantity I1D stored at 205. The second product involves the quadrature voltage V1Q and the current voltage quantity I1Q also stored at 205.

$W_x$ is made equal to the difference of two products which is halved. One product is of the direct voltage V1D by the quadrature current I1Q, the other product, to be subtracted therefrom, is of the quadrature voltage V1Q by the direct current I1D. $I_1^2$, written as I(2), is made equal to the sum of two products. One is of the direct current I1D quantity stored at 205 by itself, the other is of the quadrature current quantity I1Q stored at 205 by itself.

From 206 the system goes to 207 for the determination of the following quantities relating to the motor reactances couched in program instructions form: R(1), the stator resistance, namely L1×W1; R(P) the parallel combination of the stator and rotor leakage reactances; R(M) the magnetizing reactance; R(S) the sum of the magnetizing reactance and the rotor leakage reactances; R(A) the air gap reactance; R(O) the motor overall reactance and R(B) the motor overall real impedance. For these calculations, the following constants are given by the manufacturer:

$L_1$, $L_2$, and $L_M$.

From these constants, the programmer has calculated and stored the following desired constants:

$$L(P) = \frac{L_M L_2}{L_M + L_2} \quad L(S) = L_M + L_2$$

Accordingly, at block 207, successive computations are caused to be made as follows: First the stator reactance R(1) is obtained from the product of $L_1$ and $\omega_1$ as stored initially. Then, R(P) is obtained from the product of $\omega_1$ and L(P), also stored initially. Similarly, R(M)=$\omega1 \times$LM; R(S)=$\omega1 \times$L(S). From Wx and $I_1^2$ written as I(2) stored at 206, the value of R(0)$_2$ is obtained by dividing Wx by I(2). Also from Wx and I$_1^2$ written as I(2) stored at 206, R(B) is obtained by dividing Wy by I(2). The air gap reactance R(A) is calculated by making the difference between R(0) and R(1) previously calculated and stored.

The system goes to block 208 which performs calculations leading to the stator resistance R$_1$ as follows:

M(1) is made equal to the difference to R(A)-R(P), the two values obtained at block 207. M(2) is made equal to the negative of the sum of R(A) and R(M) where R(A) and R(M) are as obtained at block 207. M(3) is made equal to the product of M(1) and M(2). M(R) is made equal to the square root of M(3), by calling a subroutine returning the square root of the operand M(3). Finally, R$_1$ written as R(1) is made equal to the difference M(R)-R(B), where R(B) is as stored at block 207, and M(R) is as just obtained at block 208. The value of R$_1$ is stored at 209 for later retrieval and use within the simulated network as explained hereinafter in the light of FIG. 5. At 210 the load resistance R$_L$ is calculated using some of the data obtained at 208. It is observed, though, that R$_L$ may be retained first and R$_1$ can be derived after, using data obtained during the calculation of R$_L$. All this is matter for the man skilled in the art. First M(4) is equated to M(1)/M(2). Then, M(L) is equated to SQR [M(4)], namely, with the operand M(4) just obtained a subroutine is called to return the square root thereof.

At 211 the system stores the value of R$_L$ in the memory location from which it can be retrieved for further use singly or with the value of R$_1$ retrieved from another location in the memory.

Figure 7:
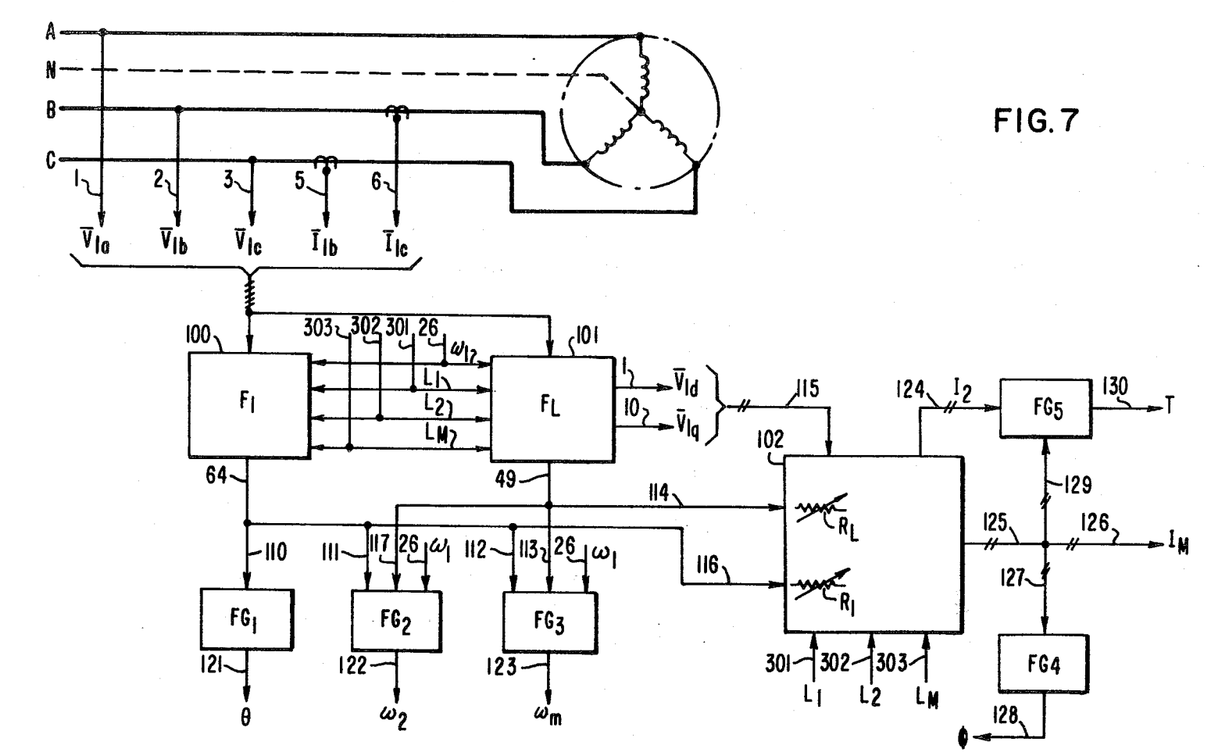
FIG. 7 is a block diagram of the motor operation determining apparatus according to the present invention as used for the derivation of the dynamic characteristics of an induction motor under load.

Referring to FIG. 7, the apparatus according to the present invention is shown in its integrality as a block diagram. FIG. 7 shows on lines 1, 2, 3, the derivation of sensed terminal voltages $\overline{V}_{1a}$, $\overline{V}_{1b}$, $\overline{V}_{1c}$ applied to the motor and on lines 5, 6 the derivation of sensed line currents $\overline{I}_{1b}$ $\overline{I}_{1c}$. These five signals are converted into digital signals (not shown) as generally known, and the direct and quadrature components thereof are derived in accordance with the teaching of U.S. Pat. No. 3,909,687 of A. Abbondanti, and in accordance with blocks M$_1$ through M$_3$ of FIGS. 3 and 4 down to lines 1, 10, 13 and 14 thereof. Thus, the direct and quadrature components $\overline{I}_{1d}$, $\overline{I}_{1q}$, $\overline{V}_{1d}$, $\overline{V}_{1q}$ are generated within circuits 100 and 101, as an initial step to the generation of functions F$_1$ and F$_L$, respectively. The values L$_1$, L$_2$, L$_M$ are inputted via lines 301, 302 and 303, respectively into circuits 100 and 101 and 102 of FIG. 7. Circuit 100, in accordance with FIG. 3, provides on line 64 the instantaneous value R$_1$ of the stator resistance, and circuit 101, like with FIG. 4, provides on line 49 the instantaneous load resistance R$_L$. These two instantaneous values, via line 116 for R$_1$ and via line 114 for R$_L$, are fed into a simulated network 102 which is a two-phase representation of the induction motor, like shown in FIG. 5. Thus, line 116 goes to the R'$_1$ element of the direct phase and to the R'$_1$ element of the quadrature phase, while line 114 goes to the R'$_L$ element of the direct phase and to the R'$_L$ element of the quadrature phase, thereby setting each component resistor to the instantaneous value derived from circuits 100 and 101, respectively, or at steps 208 and 210 of the flow chart of FIG. 6. The direct voltage $\overline{V}_{1d}$ and the quadrature voltage V$_{1q}$ are derived from circuit 101 as shown (or from circuit 100 as an obvious alternative) on line 115 on FIG. 7. The derivation of the direct voltage and current V$_{1d}$, I$_{1d}$ and quadrature voltage and current V$_{1q}$, I$_{1q}$ is as illustrated in FIG. 3 or FIG. 4.

Once R'$_1$ via line 116, R'$_L$ via line 114 and the direct and quadrature components of lines 115 have been applied to network 102, the latter becomes a live representation of the motor. Accordingly, from the simulated network 102 is derived on line 125 the magnetizing current I$_M$. Also from network 102 is derived the rotor current I$_2$. Actually, like lines 115, lines 124 and 125 are two lines, since as shown by the two-phase network of FIG. 5 the direct and quadrature components are in fact derived in each instance, namely I$_{Md}$ and I$_{Mq}$ on lines 125, I$_{2d}$ and I$_{2q}$ on lines 124.

Figure 8:
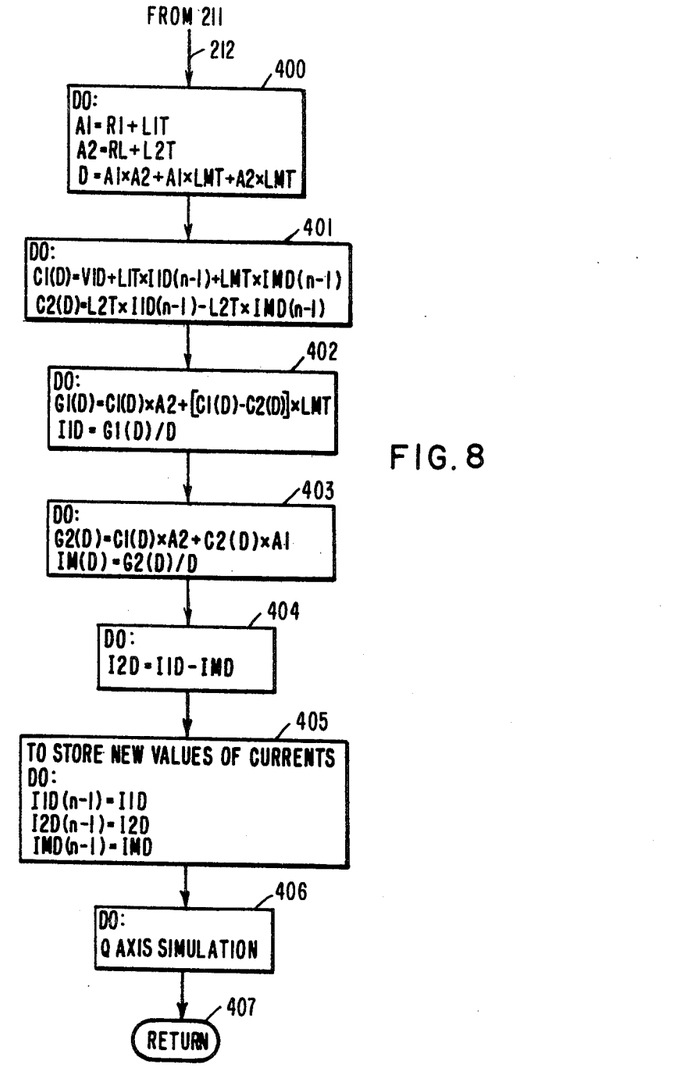
FIG. 8 is a flow chart explaining the use and operation of the simulated network embodied in the apparatus of FIG. 7.

Referring to FIG. 8, a flow chart indicates in conventional computer language which steps the programmer should perform in order to implement fully with a computer the functional and structural characteristic of the simulated network 102 of FIG. 7.

Referring to FIG. 6, the instantaneous values of R$_1$ at block 209 and of R$_L$ at block 211 have been stored in memory and by line 212 the system goes to step 400 of FIG. 8. In the assumption made, at step 200 of FIG. 6, an interrupt is received by which the computer changes task in order to perform the tasks of FIGS. 6 and 8 without interruption. At the end of the flow chart of FIG. 8, namely at 407, the computer having completed this series of task will return to the main program, namely until the next interrupt calls for another iteration such as shown by FIGS. 6 and 8. Accordingly, by successive approximation, data are updated in the memory locations for each instant defined by an interrupt, such as t$_n$, which are used at time t$_{n+1}$, thereby leading to successive figurations of the simulated network 102 which is in accordance with FIG. 5.

It is known to simulate a network such as shown in FIG. 5 by numerical calculations performed with a computer. In the Appendix hereinafter, under (B.1) and (B.2) are given differential equations representing the network of FIG. 5. These differential equations are resolved with respect to one process variable of interest, at a time. As shown by lines 125 and 124 in FIG. 7, the variables I$_M$ and I$_2$ are needed in order to derive the flux $\phi$ and the torque T. In accordance with equations (B.1) and (B.2) of the Appendix i$_M$ and i$_2$ are to be derived as a function of the known variables, namely v$_1$, the coefficients L$_1$, L$_2$, L$_M$ as well as R$_1$ and R$_L$ which have all been separately determined.

The differential equations are thus solved by a step-by-step integration approach requiring operations to be performed on the known variables at fixed time intervals. This is achieved with routines which are run under the interrupt command of FIG. 6 from 200 on. The same interrupt used for R$_1$ and R$_2$ down to steps 208 and 210 of FIG. 6 can also be used for the simulated network 202 of FIG. 7 as shown by the flow chart of FIG. 8. Typically, the time interval ΔT between two interrupts is one millisecond. As shown by FIG. 5, the simulated network actually includes two similar networks, one for the direct, the other for the quadrature components, and FIG. 8 provides for two parallel or successive calculations where blocks 401 through 405 pattern to the direct components or upper circuit in FIG. 5, whereas block 406 for the sake of simplification represents the same blocks as used for the quadrature components, or lower circuit of FIG. 5. It is observed that the direct (D) and quadrature (Q) input quantities obtained from sampling in the R$_1$, R$_L$ calculation routine of FIG. 6 are available in the memory. Also available in the memory are the calculated values $R_1$ and $R_L$. Referring now to blocks 401 through 405 of FIG. 8, the flow chart of the operation of the upper circuit of FIG. 5, or direct axis circuit, will be shown now in the light of equations (B.4), (B.5) and (B.6) of the Appendix, namely:

$$A_1 = R_1 + L_1/\Delta t$$

$$B_1 = L_M/\Delta t$$

$$C_1 = v_1 + L_1 i_1(n-1)/\Delta t + L_M i_M(n-1)/\Delta t \quad \text{(B.4)}$$

$$A_2 = R_L + L_2/\Delta t$$

$$C_2 = L_2 i_1(n-1)/\Delta t - L_2 i_M(n-1)/\Delta t$$

$$i_1(n) = G_1/D \quad \text{(B.5)}$$

$$i_M(n) = G_2/D \quad \text{(B.6)}$$

The following variables and data from the equations are available in the memory at time $t_n$:

$V_{1D}$, read in processing laguage as V1D, is obtained from the routine converting the sensed data into direct (D) and quadrature (Q) components as part of the $R_1$ and $R_L$ computation program.

$L_1/\Delta t$ read as L1T $L_M/\Delta t$ read as LMT $L_2/\Delta t$ read as L2T ($L_1$, $L_2$, $L_M$ are constants stored in memory from the motor data sheet and $\Delta t$ is a value selected once the interrupt rate has been adopted as part of the microprocessor hardware design (typically $\Delta t = 10^{-3}$ sec)).

$I_{1D}$ (n−1) read as I1D (n−1), $I_{MD}$ (n−1) read as IMD (n−1). (These are the values stored as a result of calculations made during the previous step, namely at time $t_{(n-1)}$.) $I_{1D}$ read I1D, $I_{MD}$ read IMD. (These values are obtained as a result of running the routine after the previous interrupt occurrence.)

$R_1$ read as R1, $R_L$ read as RL. (These are also values used at time $t_n$ which have been obtained from the previous routine; namely at time $t_{(n-1)}$.)

Therefore, at 400 the system calculates the coefficients $A_1$ and $A_2$ of equation (B.3) as defined by equations (B.4) of the Appendix. $A_1 = R_1 + L1T$; $A_2 = R_L + L2T$ and $B_1$ is $L_M\omega T$ read LMT, as seen from the equation set (B.4) in the Appendix.

Then, also at 400, the determinant D is obtained by the computation $D = A_1A_2 + A_1B_1 + A_2B_1$ according to the relationship in the equation set (B.10) of the Appendix.

From 400 the system goes to 401 where the two independent terms $C_1$, $C_2$ in the (B.3) set of equations of the Appendix are calculated as stated in the (B.4) set of equations of the Appendix. These formulations are couched in a language suitable for programming in the direct (D) axis line of derivation, as follows:

$$C1(D) = V1D + L1T \times I1D(n-1) + LM\text{-}T \times IMD(n-1)$$

$$C2(D) = L2T \times T1D(n-1) - L2T \times TMD(n-1)$$

Then, the system goes to 402 where the set of equations of the Appendix is resolved for $I_1$. Accordingly, from (B.10) in the Appendix, the coefficient $G_1$ couched as G1(D) is written as an instruction to be performed as: $C1(D) \times A2 + [C1(D) - C2(D)] \times LMT$. Similarly, $I_{1d}$ becomes from B.5 in the Appendix: $I1(D) = G1(D)/D$ where D is the determinant provided at 400.

In a similar fashion at 403, $G_2$ and $I_{Md}$ are calculated according to (B.10) and (B.6) in the Appendix with instructions as follows: $G2(D) = C1(D) \times A2 + C2(D) \times A1$ and $IM(D) = G2(D)/D$.

At the following step 404, $I_{2d}$ is calculated in accordance with (B.7) of the Appendix, namely, with the calculation: $I2D = I1D - IMD$.

At 405, the new values of currents are stored as old values to be used in the next iteration. In other words, $t_n$ becomes $t_{n-1}$. I1D (n−1) = I1D; I2D (n−1) = I2D and IMd (n−1) = IMD.

In the flow chart for the sake of simplification, as earlier stated, the step shown as 406 actually is another series of steps like 401, 402, 403, 404 and 405, in which, for the q-axis, the operation of solving (B.1) and (B.2) is repeated in a routine where V1Q is the stored variable and I1Q (n−1) and IMQ (n−1) are stored results from the previous iteration. The value of the determinant D derived at 400 is used to obtain the results I1Q, IMq and I2Q like at step 405 in the d-axis derivation. All this is current practice for microprocessor treatment.

FIG. 7 also shows five function generators $FG_1$–$FG_5$ which serve to derive process variables that can be singly, severally or in combination used in practical control applications as explained hereinafter.

Figure 9:
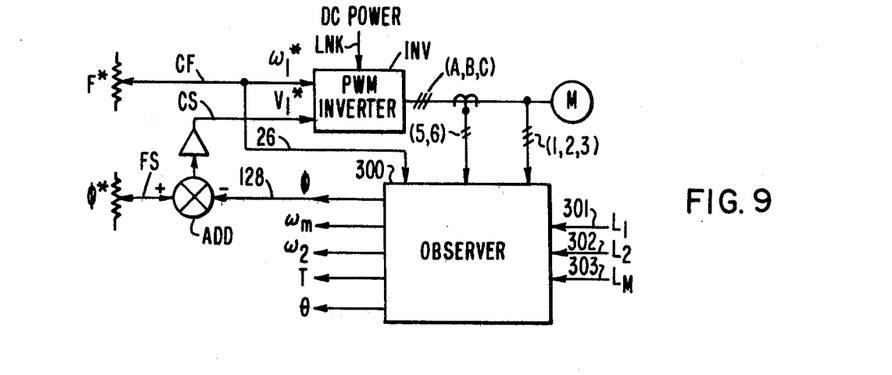
FIG. 9 is a schematic representation of an open loop frequency-controlled and closed-loop flux-controlled induction motor drive using the apparatus of FIG. 7.

FIG. 9 shows an open loop frequency control system including a closed loop for flux control which is like explained in U.S. Pat. No. 3,909,687 of A. Abbondanti.

Circuit 300 is like shown in FIG. 7 where the magnetizing current $I_M$ (namely $I_{Md}$ and $I_{Mq}$) derived on lines 125 is fed by lines 127 into a function generator $FG_4$ providing on line 128 the instantaneous flux $\phi$, thus without the use of any flux sensor on the machine. Function generator $FG_4$ is based on the following formula. The flux $\bar{\phi} = \bar{I}_M$ vectorially, which, translated into the two-phase circuit of FIG. 5, can be derived from lines 125 of FIG. 7 into circuit 102 as $\phi_d = k\ I_{Md}$ and $\phi_q = k\ I_{Md}$. Accordingly, the absolute value $|\phi|$ is $[\phi^2_d + \phi^2_q]^{\frac{1}{2}} = k\ [I^2_{Md} + I^2_{Mq}]^{\frac{1}{2}}$ which defines clearly function generator $FG_4$. The value $|\phi|$ so derived is generated on line 128. Motor M is controlled from a pulse-width-modulation inverter INV supplied with DC voltage power from a DC link LNK. The command frequency $\omega_1$ is applied by CF to the inverter in accordance with a reference value F*. The voltage command $V_1^*$ is applied to the modulator of the inverter and controls the motor voltage. The command frequency $\omega_1$ is supplied by line 26 to circuit 300. An adder ADD compares the flux of line 128 with a reference flux signal $\phi^*$ derived on line FS and the control signal establishes a corrective signal $V_1^*$ on line CS into the modulator voltage control of the inverter INV, thereby varying the output voltage to maintain the flux of the motor constant when the motor drive is speed regulated from line CF.

Figure 10:
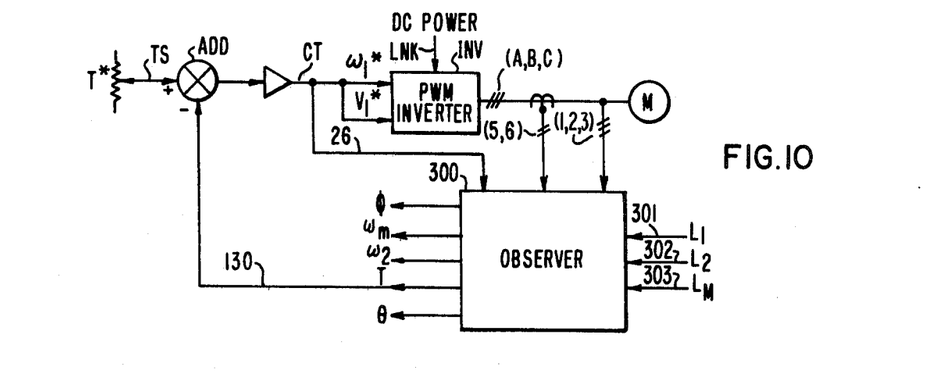
FIG. 10 is a schematic representation of a closed-loop torque-controlled and open loop flux-controlled induction motor drive using the apparatus of FIG. 7.

Referring to FIG. 10, circuit 300 is shown in association with the PWM inverter INV and motor M of FIG. 9, where the torque T is derived, rather than the flux. This is a closed loop torque control system with an open loop flux control mode. The torque signal derived on line 130 from function generator $FG_5$ (FIG. 7) is applied to an adder ADD for comparison with a reference torque signal T* derived on line TS. Control by line CT from ader ADD establishes a frequency reference signal $\omega_1^*$ for inverter control, and this signal is also fed by line 26 into circuit 300. Moreover, a control signal $V_1^*$ is fed from CT into the inverter INV, in accordance with general control practice.

Function generator FG$_5$ is in accordance with the well-known formula of the torque T=I$_2$×I$_M$ sin α, where I$_2$ is the rotor current, I$_M$ the magnetizing angle and α the phase angle between the two currents. The torque T is also (I$_{2d}$×I$_{Mq}$)−(I$_{2q}$×I$_{Md}$) when translated into the two-phase system of FIG. 5. I$_{2d}$ and I$_{2q}$ are derived as shown in FIG. 8 in accordance with the two-phase system of FIG. 5. The two signals are outputted by the simulated network 102 on double lines 124 into FG$_5$. I$_M$ is applied via lines 125 and 129 into FG$_5$. The above stated formula of the torque T, clearly defines the function generator FG$_5$ for outputting the process variable T on line 130.

Figure 11:
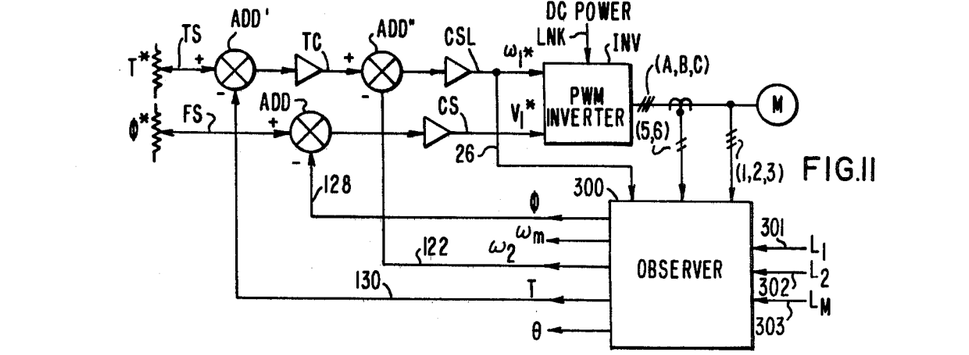
FIG. 11 is a closed-loop torque-controlled and closed-loop flux controlled induction motor drive embodying the apparatus of FIG. 7.

Referring to FIG. 11 an induction motor is controlled by a pulse width modulation inverter with a closed loop for flux control like in FIG. 9, but with a closed loop for torque control and an inner loop thereof involving slip control. Accordingly, the flux is derived from circuit 300 from line 128, compared with a flux signal on line FS as a reference, and control is applied by CS to generate a voltage reference V$_1$* for constant flux regulation. Also, the torque is derived by line 130 from circuit 300, and compared with a torque reference signal on line TS in an adder ADD'. The torque control signal TC at the output of ADD' is itself used as a reference for comparison with a slip signal derived on line 122 from the function generator FG$_2$ of FIG. 7. The comparison by an adder ADD'' provides a signal on line CSL which is used as the reference frequency signal ω$_1$* for the inverter, and which by line 26 goes to circuit 300.

Function generator FG$_2$ is responsive to the frequency signal of line 26, to the signal from circuit 100, by lines 64 and 111, and to the signal from circuit 101 on lines 49 and 117 in accordance with the definition of the slip frequency of:

$$\omega_2 = \frac{R_2}{R_L} \omega_1$$

where R$_2$ is the rotor resistance. Since the stator resistance R$_{1(O)}$ at normal temperature becomes R$_1$ at temperature θ of operation, it is known a good approximation that the rotor resistance R$_{2(O)}$ at normal temperature will become R$_2$ at the same temperature θ with:

$$R_2 = R_2(O) \times \frac{R_1}{R_1(O)}$$

Accordingly, by line 111 the value of R$_1$ and by line 117 the value of R$_L$ are supplied to function generator FG$_2$ so as to derive ω$_2$ as just defined. The outputted value of ω$_2$ on line 122 is the value supplied from circuit 300 to adder ADD'' of FIG. 11.

Figure 12:
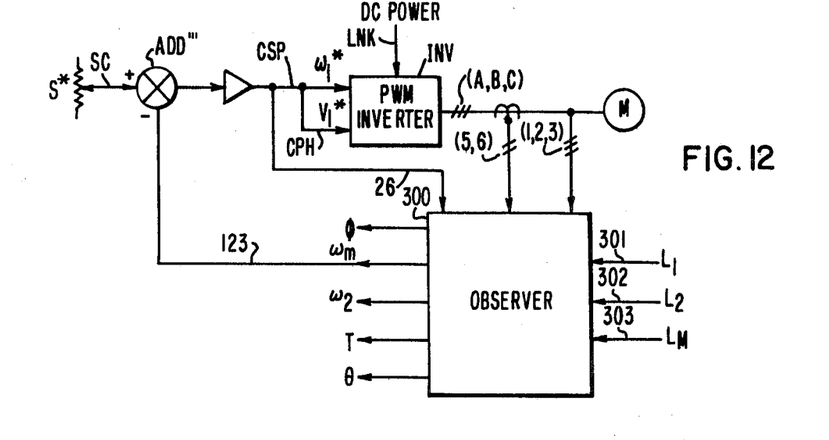
FIG. 12 is a closed-loop speed-controlled and open loop flux-controlled induction motor drive using the apparatus of FIG. 7.

Referring to FIG. 12, a control system for an induction motor controlled from a PWM inverter is shown in which flux control is by an open loop and the shaft speed is regulated by a closed loop. A speed signal on line 123 from circuit 300 is compared by an adder ADD''' to a speed control signal SC and the control signal so derived on line CSP is applied to the inverter as a frequency command signal δ$_1$* on line CSP and as a voltage command signal on line CPH and also via line 26 to circuit 300. The shaft speed of line 123 is derived from a function generator FG$_3$ (see FIG. 7). Function generator FG$_3$ is defined by the relation ω$_m$=ω$_1$−ω$_2$. Although this value can be derived directly from the slip signal of line 122, it is assumed for the purpose of illustration that shaft speed is desired again from the slip frequency. Therefore, like for the deviation of the slip in function generator FG$_2$, the output signals of lines 64 and 49 are applied to FG$_3$ by lines 112 and 113, respectively. The frequency signal ω$_1$ from line 26 is also applied to function generator FG$_3$ and ω$_2$ is calculated as explained with FG$_2$.

Figure 13:
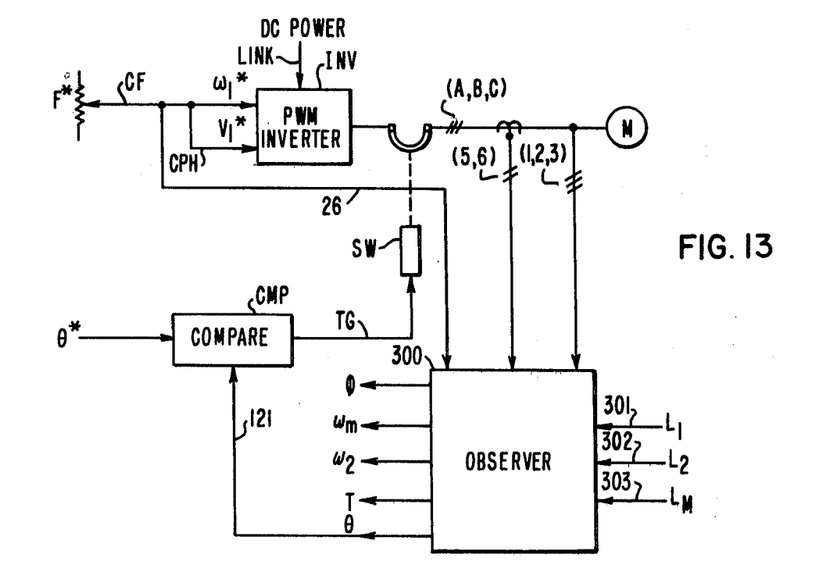
FIG. 13 is an open-loop frequency-controlled and an open loop flux-controlled induction motor drive with overheating protection embodying the apparatus of FIG. 7.

Referring to FIG. 13, a system is shown in which the temperature of the stator, and more generally of the motor, is derived with circuit 300 and function generator FG$_1$ thereof, namely on line 121. A comparator CMP compares θ of line 12' with a reference temperature θ*. Whenever the motor temperature due to overheating exceeds the reference, by line TG a protective switch SW is triggered causing the motor to be brought to a stop.

The system of FIG. 13 can be used to remotely protect a motor, for instance, deep in a shaft as in a mine shaft or a well. In a manner similar to the derivation of temperature, it is possible to directly use the signal derived on line 49 from circuit 101 in order to provide an instantaneous load representative signal, and to control the motor remotely for protection in case of an overload, namely when R$_L$ exceeds a predetermined limit.

It is understood that, although an induction motor generally is of the three-phase type, obvious variations are the two-phase and the six-phase induction motor. In the case of a two-phase motor, it is a straightforward deduction for the man skilled in the art to apply the present invention by starting with the teachings herein from the direct and quadrature determinations. In the case of a six-phase motor, an obvious extension of the present invention would be to merely use, side-by-side, two identical systems like described in the instant specification.

The following is the Appendix.

APPENDIX

A. New expressions for the resistive parameters of an induction motor.

Given the network of FIG. 1, in which R$_1$ and R$_L$ are unknown, but L$_1$, L$_M$, L$_2$ are known, as well as $\overline{V}_1$, $\overline{I}_1$ and the angle φ between these phasors, it is possible to express R$_L$ as a function F$_L$ of L$_1$, L$_M$, L$_2$, ω$_1$, V$_1$, I$_1$ and φ, independently from the unknown R$_1$. This is proven by calculating the combined impedance:

$$(j\omega_1/L_M) / (j\omega_1 L_2 + R_L)$$

This is resolved in terms of the sum of a real impedance r and an imaginary impedance jw$_1$ as follows:

$$r = \omega_1^2 L_M^2 R_L / [R_L^2 + \omega_1^2 (L_M + L_2)^2] \quad (A.1)$$

$$\lambda = L_M [R_L^2 + \omega_1 L_2 (L_M L_2)] / [R_L^2 + \omega_1^2 (L_M + L_2)^2] \quad (A.2)$$

The two parallel branches in the equivalent circuit of FIG. 1 can be replaced by a single branch including an inductance λ in series with a resistor r. Since the reactive power obsorbed the circuit (where $\overline{V}_1$ is the input voltage, $\overline{I}_1$, φ the inputted current of phase θ and $\overline{E}_1$ the potential between the two ends of the (λ, r) branch) is:

$$W_x = V_1 I_1 \sin \phi/2,$$

the principle of conservation of reactive power, by which the total reactive power delivered at the input can only be found in the reactive elements of the circuit, when applied to the circuit, is expressed by:

$$W_x = \omega_1(L_1+\lambda)I_1^2/2 \text{ or } \omega_1\lambda = 2W_x/I_1^2 - \omega_1L_1 \quad (A.3)$$

If $2W_x/I_1^2 - \omega_1L_1 = a$ substituting for $\lambda$ its value taken from (A.2) into (A.3), leads to:

$$a = \omega_1 L_M[R_L^2 + \omega_1 L_2(L_M+L_2)]/[R_1^2(L_M+L_2)^2]$$

Solving for $R_L$ yields:

$$R_L = \omega_1(L_M+L_2)\{[a - \omega_1 L_M L_2/(L_M+L_2)]/\omega_1 L_M - a]\}^{\frac{1}{2}} \quad (A.4)$$

The second member of (A.4) is the function $F_L$ announced above.

Likewise, it is possible to express $R_1$ as a function $F_1$ of $L_1$, $L_M$, $L_2$, $\omega_1$, $V_1$, $I_1$ and $\phi$, independently from the unknown $R_L$. This is proven by substituting $R_L$ from (A.4) into (A.1), thereby obtaining:

$$r = \{[a\omega_1 L_M L_2/(L_M+L_2)][\omega_1 L_M - a]\}^{\frac{1}{2}} \quad (A.5)$$

Again, the real power absorbed by the circuit being $W_y = V_1 I_1 \cos \phi/2$, the principle of conservation of real power, by which the input real power can only be dissipated in the resistive elements, leads from the circuit to:

$$W_y = (R_1+r)I_1^2/2 \text{ or } R_1 = (2W_y/I_1^2) - r \quad (A.6)$$

If $2W_y/I_1^2 = b$, substituting for $r$ its value taken from (A.5) into (A.6):

$$R_1 = b - \{[a - \omega_1 L_M L_2/(L_M+L_2)][\omega_1 L_M - a]\}^{\frac{1}{2}} \quad (A.7)$$

The second member of (A.7) is the intended function $F_1$.

B. Microprocessor representation of the observer

Referring to FIG. 1 with $v_i$, $i_i$ being the instantaneous values of voltages and currents, the three equations governing the circuit are:

$$v_1 = (sL_1+R_1)i_1 + sL_M i_M \quad (B.1)$$

$$sL_M i_M = (sL_2+R_L)(i_1-i_M) \quad (B.2)$$

$$i_2 = i_1 - i_M$$

$v_1$ is known by sampling the motor terminal voltage. The above system of three equations must be solved numerically in order to determine the unknown $i_1$. At sample instant $t_n$, the value of $v_1(n)$ is acquired. The value of $i_1(n)$ is not known, but the previous value $i_1(n-1)$ of $i_1$ has been acquired during the previous sampling interval through calculations. Also is known the old value $i_M(n-1)$ of the magnetizing current, whereas the present value $i_M(n)$ is unknown.

Replacing in (B.1) and (B.2) $si_1$ and $si_M$ respectively by $[i_1(n)-i_1(n-1)]/\Delta t$ and $[i_M(n)-i_M(n-1)]/\Delta t$, where $\Delta t$ is the duration of the sampling interval, and grouping the known terms on the right side, the unknown terms on the left side, the following *difference equations* is obtained:

$$A_1 i_1(n) + B_1 i_M(n) = C_1$$

$$-A_2 i_1(n) + (A_2+B_1)i_M(n) = C_2 \quad (B.3)$$

in which $$A_1 = R_1 + L_1/\Delta t$$

$$B_1 = L_M/\Delta t$$

$$C_1 = v_1 + L_1 i_1(n-1)/\Delta t + L_M i_M(n-1)/\Delta t \quad (B.4)$$

$$A_2 = R_L + L_2/\Delta t$$

$$C_2 = L_2 i_1(n-1)/\Delta t - L_2 i_M(n-1)/\Delta t$$

The coefficients $A_1$ through $C_1$ and $B_2$, $C_2$ are all known at the instant of sampling. Thus, the linear system (B.3) can be solved, yielding:

$$i_1(n) = G_1/D \quad (B.5)$$

$$i_M(n) = G_2/D \quad (B.6)$$

where D is the determinant given by:

$$D = A_1 A_2 + A_1 B_1 + A_2 B_1;$$

$$G_1 = C_1 A_2 + (C_1 - C_2)B_1 \quad (B.10)$$

$$G_2 = C_1 A_2 + C_2 A_1$$

As to the rotor current term, it is solved by the following expression:

$$i_2(n) = i_1(n) - i_M(n) \quad (B.7)$$

I claim:

1. Apparatus for the determination of the load resistance of a rotating field motor, having a squirrel cage rotor, supplied under three terminal voltages and three line currents, comprising:
   first means for sensing said three terminal voltages and means for sensing two of said line currents for deriving corresponding sensed signals;
   second means responsive to said sensed signals for deriving direct and quadrature voltage and current component signals representative of said sensed terminal voltages and line currents;
   third means responsive to said direct and quadrature voltage and current component signals for deriving the following quantity in real time: motor overall reactance $2W_X/I_1^2$; and
   fourth means for deriving with said quantity a representation of the load resistance $R_L$ in accordance with the formula:

$$R_L = \omega_1(L_M+L_2)\{[a - \omega_1 L_M L_2/(L_M+L_2)]/[\omega_1 L_M - a]\}^{\frac{1}{2}}$$

where
   $L_M$ is the leakage inductance,
   $L_1$ is the stator inductance,
   $L_2$ is the rotor inductance,
   $\omega_1$ is the terminal line frequency,
   $W_X$ being the reactive power equal to $(V_1 I_1 \sin \phi)^{\frac{1}{2}}$
   $I_1$ being the stator current, $V_1$ the stator voltage
   $\phi$ the phase angle between $V_1$ and $I_1$,
   $a$ is the air gap reactance equal to $2W_X/I_1^2 - \omega_1 L_1$, the parallel combination of stator and rotor leakage reactances $\omega_1 L_M L_2/(L_M+L_2)$, and the stator leakage reactance $\omega_1 L_1$, thereby to provide a signal representative of the instantaneous load resistance $R_L$ of the motor.

2. The apparatus of claim 1 with said third means deriving a second quantity representing the motor overall real impedance $2W_Y/I_1^2 = b$; and means for deriving with said quantity a representation of the stator reactance $R_1$ in accordance with the formula:

$$R_1 = b - \{[a - \omega_1 L_M L_2/(L_M + L_2)][\omega_1 L_M - a]\}^{\frac{1}{2}}$$

thereby to provide a signal representative of the instantaneous stator resistance $R_1$ of the motor Wy being the real power equal to $(V_1 I_1 \cos \phi)^{\frac{1}{2}}$.

3. The apparatus of claim 2 with means responsive to the derived instantaneous resistance $R_1$ for measuring the temperature of the rotor.

4. The apparatus of claim 3 with means for controlling the motor in response to overheating detected in response to said temperature measuring means.

5. The apparatus of claim 2 with the provision of two-phase network means responsive to said direct and quadrature voltage and current component signals and responsive to said instantaneous stator resistance and instantaneous load resistance for simulating the motor in operation, under said terminal voltages and line currents of a given frequency $\omega_1$, to derive a signal representative of the magnetizing current of the motor; and
means for controlling the motor in accordance with the derived magnetizing current representation signal.

6. The apparatus of claim 5 with function generator means responsive to said network means and to said magnetizing current signal for generating a signal representative of the motor torque.

7. The apparatus of claim 6 with means for controlling the motor in accordance with said torque signal.

8. The apparatus of claim 5 with function generator means responsive to said magnetizing current signal for generating a signal representative of the flux.

9. The apparatus of claim 8 with means for controlling the motor in accordance with said flux signal.

10. The apparatus of claim 2 with function generator means responsive to said instantaneous stator resistance and load resistance signals for generating a signal representative of the slip $\omega_2$ of the motor.

11. The apparatus of claim 10 with function generator means responsive to said signal representative slip and to a signal representative of the frequency $\omega_1$ of said voltage and circuit signals for generating a signal representative of the motor signal $\omega_m$.

12. The apparatus of claim 10 with means for controlling the motor in relation to the slip.

13. The apparatus of claim 11 with means for controlling the motor in relation to speed.

14. The apparatus of claim 2 with means responsive to a predetermined load reference signal and to said instantaneous load resistance signal for protecting the motor against an overload.

* * * * *